United States Patent Office 3,080,995
Patented Mar. 12, 1963

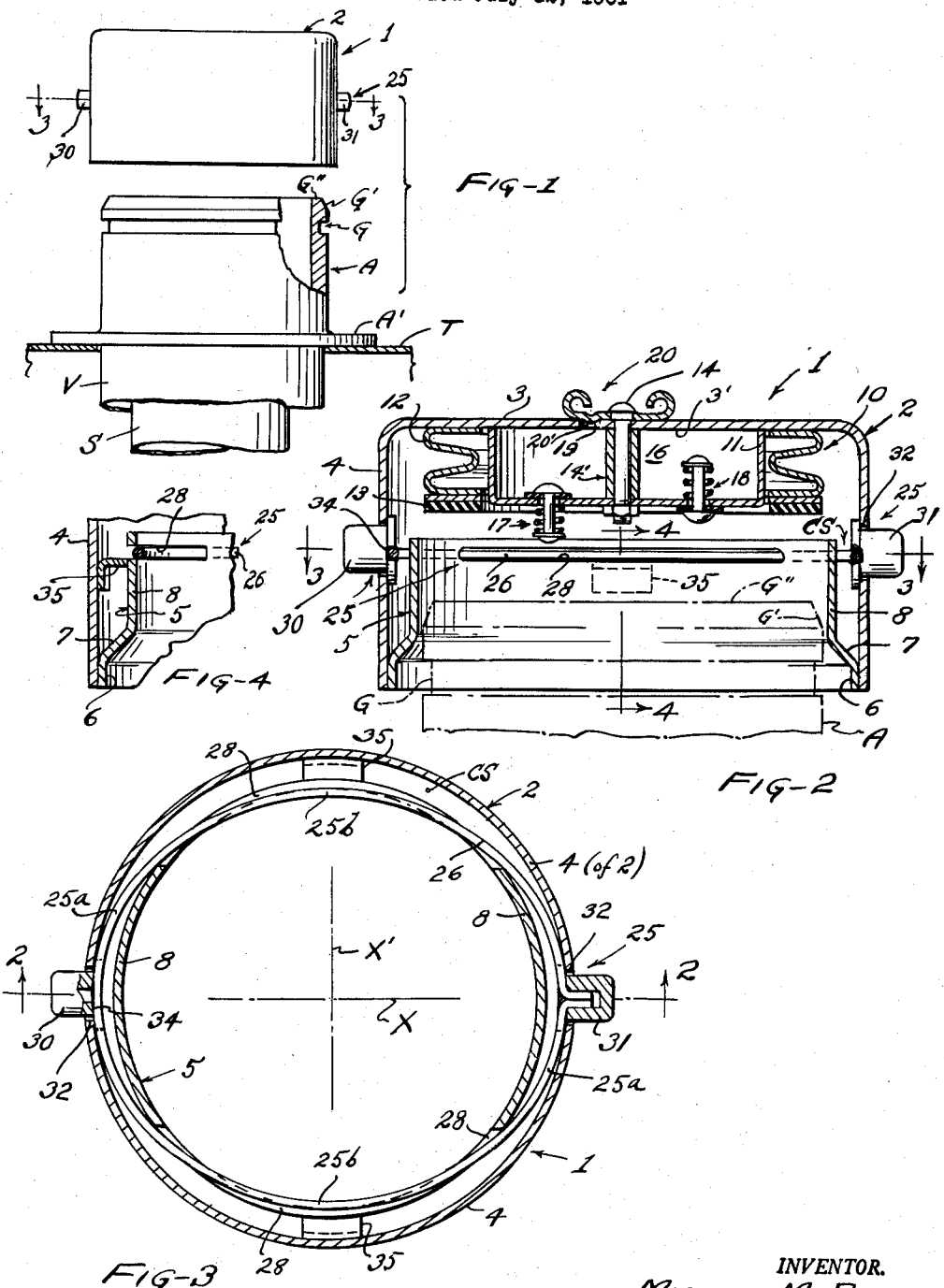
INVENTOR.
MICHAEL M. PALM
BY George M. Soule
ATTORNEY

3,080,995
FUEL TANK FILLER ADAPTER CAP
Michael M. Palm, Marion, Ohio, assignor to Curtiss-Wright Corporation, a corporation of Delaware
Filed July 12, 1961, Ser. No. 123,977
5 Claims. (Cl. 220—55)

In a co-pending application of Walter S. Gearhart and James W. Hammond for United States Letters Patent Serial No. 123,385 filed July 6, 1961 entitled Closed Pressure System for Dispensing Fluids, said application and invention being owned by the assignee hereof, a fuel tank charging or refilling system and apparatus, particularly for military motor vehicles, are disclosed comprising a partly manual and partly automatically operable nozzle mechanism and a cooperating tank filler adapter or fuel receiving assembly or unit designed principally for closed or sealed pressure fuel dispensing operations, whereby the rate of feeding of fuel to the vehicle tank can be very high as compared to rates employed in open fuel tank filling as commonly practiced in automobile service stations. The receiving neck portion of the adapter unit into which a nose portion of the nozzle unit extends and is sealed prior to filling of the tank required, for military use, a relatively quickly detachable sealing cap with vapor venting means and (usually) water excluding means thereon in order to guard the filler opening during operation of the vehicle.

The principal object of the present invention is to provide a self latching, readily manually detachable fuel cap device for uses such as indicated above, which shall be completely reliable in operation and mountable in any turned position of the cap about its central axis to maintain the tank filler opening closed during operation of the vehicle, and also which will be of simple inexpensive construction.

A more specific object is to provide a simple and effectual cap for a fuel tank filler adapter having a circular axial shoulder as on a peripheral groove around its free or exposed end, and wherein the cap has a strong, reliable and quickly releasable means for automatic engagement with such shoulder or groove.

Other objects and features of the invention will become apparent from the following description of the embodiment shown in said drawing. The essential characteristics are summarized in the claims.

In the drawing, FIG. 1 is a small scale, exploded view showing the fuel tank cap 1 hereof poised over an exposed portion, partially shown, of the filler adapter assembly A as in said Gearhart and Hammond application.

FIG. 2 is a full scale central longitudinal or axial cross-sectional view of the tank cap of FIG. 1 and, in broken lines, an associated upper portion of the adapter about to be received in the cap.

FIG. 3 is a transverse cross sectional assembly plan view of the fuel tank cap, taken as indicated by the line 3—3 on FIG. 2.

FIG. 4 is a detail fragmentary sectional view taken as indicated by the lines 4—4 on FIGS. 2 and 3.

The present invention as shown, is embodied in a simple manually releasable closure cap unit for a filling neck portion of a tank or container particularly for volatile fluids such as engine fuel, the neck portion having a beveled or other suitably shaped camming surface underhung by a latching shoulder, the cap unit having a normally elliptical or oval wire spring fastener described later, which is displaced by the camming surface into approximately circular form to enable the fastener to spring back and underlie the shoulder. Release simply requires pressure on the spring along the major axis of the ellipse or oval form which the spring tends to assume.

Filler adapter assembly A, FIG. 1, shown as though attached to the top wall T of a tank by a flange A' of the adapter has, incompletely shown, a vent skirt portion V and a stand pipe or filler tube S leading to or toward the bottom of the tank. Above the flange A', the adapter is tubular and generally cylindrical, having a groove G near its upper rim, to form an axial downwardly facing shoulder, and a tapered or frusto conical external peripheral guide or camming surface G' above the groove to pilot the present cap unit 1 into adapter closing position not shown.

The cap assembly 1, as shown by FIGS. 2 and 3 particularly, comprises, in part, a conventionally cup-shaped main body (hereinafter usually cap) 2 having a top wall 3 and an integral continuous circular metallic side wall 4. An inner stepped-diameter metallic sleeve member 5 is rigid and coaxial with the cap 2. Sleeve member 5 as shown has an axial flange portion 6 telescoping the lower interior rim surface of the cap 2 and suitably secured thereto; a tapered or frusto conical guide portion 7 for piloting or centering engagement with the filler adapter and a circumferentially continuous sleeve portion 8 approximately uniformly spaced from the side wall 4 of the body 2 a short distance to provide the annular space CS.

The illustrated sealing and relief-valve assembly 10, as shown in FIG. 2, comprises, in part, a metal spring bellows 12 sealingly attached to the lower surface 3' of the cap wall 3 and to an annular sealing (e.g., composition) washer 13 adapted to be yieldingly pressed against the top annular rim surface G'' (FIG. 1) of the adapter A as by axial stress in the bellows. Additionally a metal cup 11 has its rim portion held tightly or sealed against the same wall 3' of the cap 2 as by a pin 14 and spacer sleeve 14' retained by the pin. The bottom wall of the cup 11 carries oppositely acting relief valve assemblies 17 and 18 the valve ports of which, when the fuel cap device 1 hereof is in operation, communicate with the interior of the tank and with the external atmosphere via a hole 19 in the wall 3.

The hole 19 can be yieldably sealed by a spring button device 20 mounted for angular movement on the pin 14 so as to make the cap device exclude water when necessary, as in fording streams.

The releasable spring locking or latching device or assembly 25 as shown in FIGS. 2 and 3 comprises a normally elliptical or ellipsoidal metallic spring member 26 of piano wire or the like which, as mounted in the cap body and sleeve assembly 2, 5, has curved portions 25a along its major axis X, FIG. 3, lying wholly in the annular space CS between the walls 4 and 8 and less sharply curved portions 25b (along the minor axis X' or at right angles to portion 25a) extending loosely through respective elongated horizontal slots 28 in the sleeve portion 8 as evident from FIGS. 2 and 3.

Principally for symmetry of construction and for convenience of operation to release the spring member 25, the same has integral therewith diametrically opposite release buttons 30 and 31 along the above mentioned major axis X, FIG. 3, the release buttons being supported and guided principally by diametrically disposed holes 32 through the wall 4. Release button 30 as shown is secured to an uninterrupted portion of the spring as by solder at 34 and the button 31 has an axial opening receiving two side-by-side lateral extensions of the spring secured as by solder in or adjacent the opening.

When the unit cap 1 is slipped over the adapter A or the like it will be evident that the diametrically opposite portions 25b of the locking spring 25 will be cammed outwardly by the bevel surface G' for automatically engaging the locking groove or shoulder below the bevel surface. To remove the cap, diametrically applied pressure on one of both of the release buttons 30 and 31 (if there are two) flexes the locking spring into approximately circular form so that all portions of it which lie within the cap 2 occupy the circular space CS. Thereupon the cap can be simply lifted off the adapter A or other cooperating part with which it has been engaged.

Since, when the locking spring 25 is deflected into approximately circular form to release the adapter shoulder as by opposed axial force on the two buttons 30 and 31 the spring could then be displaced out of position by rotating it about the common axis of the release buttons, it is preferable to provide supporting devices such as 35, FIGS. 2, 3, and 4, to retain the wire spring with its principal plane coincident with the slots 28 or against such rotational displacement as mentioned.

I claim:

1. A self-locking closure device for a tank filler tube or the like having an axial overhanging shoulder around and near its marginal end or rim portion facing the tank, the closure device comprising a generally circular cap unit having inner and outer coaxial sleeve portions rigid with each other, the inner sleeve portion having diametrically opposite elongated circumferentially extending slots, a normally non-circular resilient locking ring having relatively opposed distal portions diametrically of the cap unit and lying between said inner and outer sleeve portions and having relatively opposed proximal locking portions pre-stressed to extend through respective slots as guided thereby into the interior of the inner sleeve portion for cap-unit-retaining engagement with such axial shoulder, and means accessible for operation from a region externally of the cap unit and connected to at least one of the distal portions of the ring to enable flexing of it into filler-tube-releasing form.

2. A fuel tank cap unit for cooperation with a tubular filler tube or the like having a peripherally extending axial shoulder, a cap member having a skirt or rim portion to be slipped over the filler tube and having sealing means for closing the filler tube, said cap member having inner and outer sleeve portions, the inner sleeve portion having diametrically disposed slots in a plane at right angles to the central axis of the cap member, a generally elliptical spring with diametrically opposed portions normally extending through the slots so as to be in position lockingly to engage said axial shoulder, releasing means on the cap unit operable to deflect the spring member into generally circular form to enable detachment thereof from said shoulder.

3. The cap unit according to claim 2 wherein the releasing means comprises a pair of plunger or button members secured to major axis portions of the spring and guided by radial openings in wall portions of the cap member.

4. In combination with a container filler neck member of generally circular cross section having a circumferentially extending axial shoulder facing the container, a cap unit having a main cup-like body, a generally elliptical or oval locking spring member supported in the said body transversely of its central axis and so that minor-axis-associated portions of the spring lie closer together than the outer diameter of the filler neck member outwardly beyond the shoulder, and means accessible from a region externally of the cap unit and connected with the spring along a major axis portion of it for expanding the spring toward circular form whereby to release the shoulder.

5. In combination, a tubular member, a closure member therefor adapted to telescope the tubular member, a resilient locking ring normally of elliptical or oval shape, a continuously circumferentially extending axially facing locking shoulder on one of the members, means on the other member supporting the ring thereon with its principal plane intersecting overlapping portions of the members in their telescoped position and so that opposite portions of the ring along its minor axis in said plane are movable radially and are disposed to abut said axially facing shoulder and prevent removal of the closure member, a pair of outwardly exposed releasing devices along the major axis of the ring and guided for radial movement on said other member to enable flexing of the ring toward circular shape sufficiently to clear the locking shoulder and permit removal of the closure member, said one member having a frusto-conical cam surface disposed to engage minor-axis-associated portions of the ring and expand those portions radially.

References Cited in the file of this patent

FOREIGN PATENTS 387,688 Germany _____ Jan. 2, 1924